Dec. 20, 1949     A. R. ALLARD     2,491,634
KEY HOLDER
Filed Jan. 23, 1948
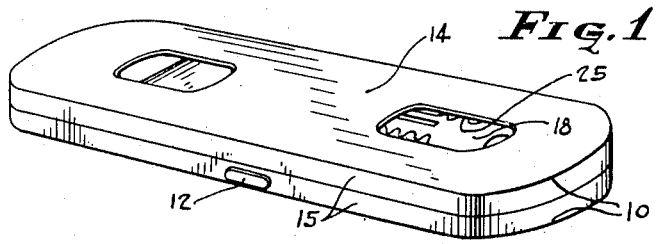
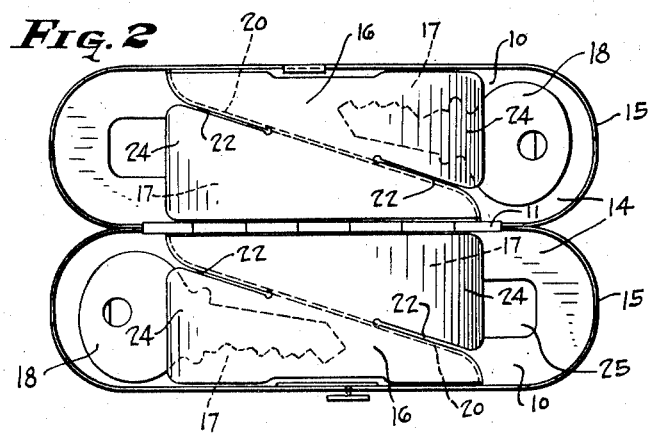
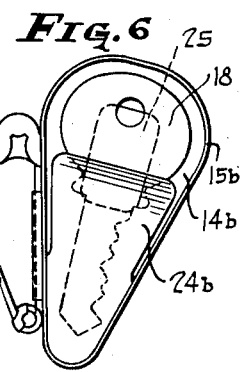
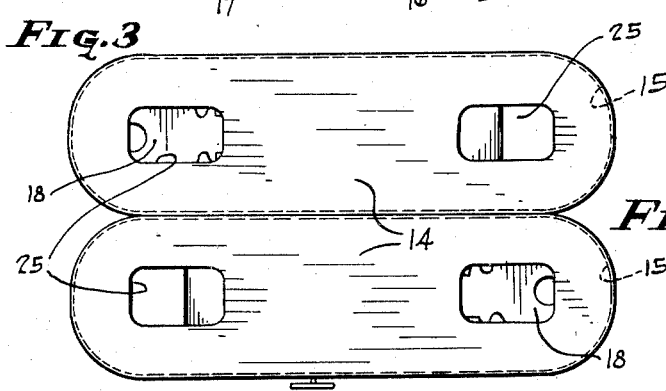
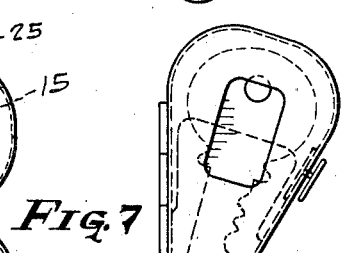
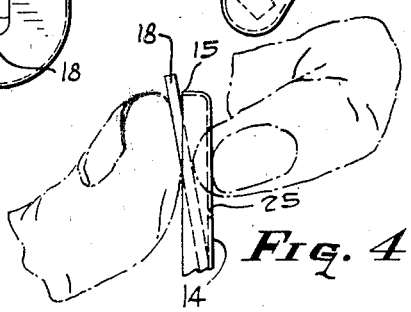
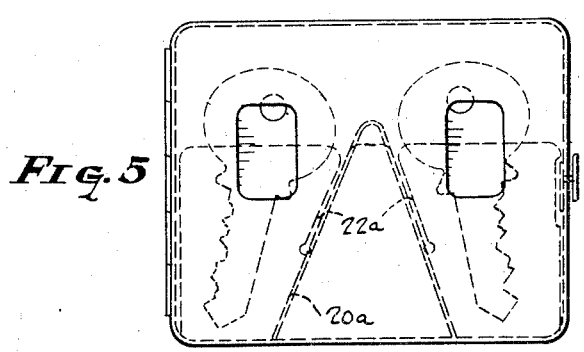
INVENTOR.
ARTHUR R. ALLARD
BY
ATTORNEY.

Patented Dec. 20, 1949

2,491,634

UNITED STATES PATENT OFFICE 2,491,634

KEY HOLDER

Arthur R. Allard, Drexel Hill, Pa.

Application January 23, 1948, Serial No. 3,969

4 Claims. (Cl. 206—37)

The invention relates to a key holder or case and it has for its object to provide apparatus of this character wherein each key is held in place in a compartment by an elastic or spring wall and by the rim of the holder or case and wherein the latter has an opening through which manual pressure may be exerted incident to removing a key from its compartment and inserting it thereinto.

The foregoing and other objects are effected by the invention as will be apparent from the following description and claims taken in connection with the accompanying drawings, forming a part of this application, in which:

Fig. 1 is a perspective view of the improved key case or box,

Figs. 2 and 3 are inside and outside views of the box with the latter open;

Fig. 4 is a detail view showing key manipulation incident to insertion and removal; and Figs. 5, 6 and 7 show modified forms of the invention.

In Figs. 1, 2 and 3 there is shown a key box or holder combining halves 10, 10 connected by a hinge 11 and held closed by a releasable snap fastening 12.

Each of the box halves 10, 10 is a rigid body having a flat side wall 14 bordered by a rim or flange 15. Elongated sheet metal members 16 are connected to the respective halves 10, 10 interiorly of the latter in spaced relation thereto to form key compartments 17 for keys indicated at 18.

As shown in Fig. 2, each member 16 is connected in spaced relation to its side wall 14 by means of a strip 20 suitably connected, as by soldering, brazing or welding, to the side wall and to the member. The partition strip 20 extends diagonally of the elongated side wall and has its ends curved toward the rim to form a pair of tapered and adjacent key compartments.

Each member 16 is slotted from its ends along the partition strip, such slots being indicated at 22 and the purpose thereof being to provide spring tongues 24 for gripping keys with respect to interior side wall surfaces. After slitting, the tongues are readily shaped or deformed to function as spring tongues for exerting gripping pressure on keys.

Each key compartment 17 is defined by the partition strip, the spring tongue, the side wall and the rim and the latter cooperates with an inserted key to hold the latter in place.

Each side wall has openings 25 for the respective compartments and through which manual pressure may be exerted to tilt a key against the tongue spring pressure to lift the head end far enough to clear the rim, whereupon, due to elongation of the opening in the direction of length of the compartment, a key may be slid along and over the rim (see Fig. 4) permitting it to be gripped between fingers and removed from the box incident to individual use of each key. To replace a key, finger pressure is exerted through the opening on the spring tongue to deflect the latter away from the side wall, thereby providing compartment key entrance space so that a key may be slid in; and, just as soon as the key head end moves past the rim, the spring tongue snaps the key in place in the compartment.

In Fig. 5, there is shown a modified arrangement formed to hold keys in side-by-side relation. In this form, the partition or spacing element 20a is of V outline and the sheet metal member is slotted as shown at 22a to provide spring tongues, which, with the side walls and the rim form key compartments.

In Fig. 6 there is shown a form for a single key, the flat wall 14b being tapered and bordered by a rim 15b and a spring tongue 24b being connected so as to be within the rim. A suitable pin 27 is joined to one edge to provide for fastening to the interior of a purse or the like.

In Fig. 7, there is shown a box type of holder for two keys and shaped and constructed similarly to Fig. 6.

What I claim is:

1. In a key holder, a rigid body comprising a flat wall and a rim or flange bordering the wall; a metallic member arranged inside of the rim, rigidly fastened to the body and having a key-gripping spring tongue deflectable away from said wall; said wall, rim and spring tongue forming a key compartment with the spring tongue cooperating with the wall to grip a key therebetween and with the wall having an opening located in relation to the compartment so that manual pressure may be exerted to deflect the spring tongue incident to removal of a key or replacement thereof.

2. In a key holder, a rigid body comprising a flat wall and a rim bordering the latter; a thin metallic sheet; means for rigidly joining the body and the sheet so that the latter is encompassed by the rim; said wall, rim, joining means, and sheet forming a compartment of tapering width; said sheet having a tongue portion extending longitudinally of the compartment, having free side and end edges, and being deflected to form a spring for pressing towards said wall; said wall having a compartment opening formed therein in opposed relation to the spring, elongated in the direction of length of the compartment, and through which manual pressure may be exerted for spring deflection incident to key removal and insertion.

3. In a key holder, a container including a flat wall and a rim or flange bordering the wall, and a thin metallic sheet rigidly fastened to said wall and cooperating therewith to provide a plurality of key compartments, said sheet having slits providing portions with free side and end edges so that they may be shaped to form spring tongues for the respective compartments and which tongues press towards said wall, said wall having openings for the respective compartments and which are located in relation to the latter so that manual pressure may be exerted therethrough for spring tongue deflection incident to key insertion and removal.

4. In a key holder, a container comprising a flat wall bordered by a rim or flange, a thin metallic sheet, and a partition member joined to said wall and sheet for holding the latter in spaced parallel relation to the wall at the rim side of the latter; said wall, rim, partition member and metallic sheet cooperating to provide a plurality of key compartments; said sheet having slits providing spring tongue portions for the compartments and which cooperate with said wall to clamp keys therebetween; said wall having openings for the respective compartments and through which finger pressure may be exerted for spring tongue deflection incident to key removal and insertion in each compartment.

ARTHUR R. ALLARD.

REFERENCES CITED

The following references are of record in the file of this patent:

UNITED STATES PATENTS

| Number | Name | Date |
|---|---|---|
| 2,228,726 | Loesch | Jan. 14, 1941 |